United States Patent
Guo et al.

(10) Patent No.: US 7,443,667 B2
(45) Date of Patent: Oct. 28, 2008

(54) MOUNTING APPARATUS FOR STORAGE DEVICES

(75) Inventors: Qin Guo, Shenzhen (CN); Guang-Yao Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 166 days.

(21) Appl. No.: 11/309,271

(22) Filed: Jul. 21, 2006

(65) Prior Publication Data

US 2007/0075200 A1   Apr. 5, 2007

(30) Foreign Application Priority Data

Sep. 8, 2005   (CN) .......................... 200520064276

(51) Int. Cl.
   *G06F 1/16* (2006.01)
(52) U.S. Cl. .................... 361/685; 312/223.2
(58) Field of Classification Search ............... 248/27.1, 248/27.3; 361/685, 681, 683, 724; 312/223.1, 312/223.2
   See application file for complete search history.

(56) References Cited

U.S. PATENT DOCUMENTS 6,661,651 B1 * 12/2003 Tanzer et al. ................ 361/685
7,036,783 B2 * 5/2006 Chen et al. ................ 248/298.1
7,272,012 B2 * 9/2007 Salinas et al. ............... 361/727
2004/0095716 A1 * 5/2004 McAlister ................... 361/685
2004/0125555 A1   7/2004 Chen
2005/0007734 A1 * 1/2005 Peng et al. ................. 361/685
2005/0024819 A1 * 2/2005 Peng et al. ................. 361/685
2005/0047075 A1 * 3/2005 Roesner ..................... 361/685
2005/0207108 A1 * 9/2005 Chen ......................... 361/685
2006/0039106 A1 * 2/2006 Hidaka ...................... 361/685

FOREIGN PATENT DOCUMENTS

| CN | 01279552.6 | 1/2003 |
| TW | M245477 | 10/2004 |
| TW | 1235029 | 6/2005 |

* cited by examiner

Primary Examiner—Amy J. Sterling
(74) Attorney, Agent, or Firm—Wei Te Chung

(57) ABSTRACT

A mounting apparatus for holding a storage device with a plurality of mounting holes thereof. The mounting apparatus includes a bracket for accommodating the storage device therein and a fastener. The bracket includes a first sidewall. The first sidewall has a pair of installing plates and a securing portion opposite to the pair of installing plates. A plurality of through holes is defined between the pair of installing plates and the securing portion, corresponding to the mounting holes. The fastener has a pivot end pivotally attached to the pair of installing plates and a free end forming a locking portion engagable with the securing portion. A plurality of locking pegs projects from the fastener. When the locking pegs are passed through the through holes and inserted into the mounting holes of the storage device, the storage device is secured in the bracket.

15 Claims, 7 Drawing Sheets

MOUNTING APPARATUS FOR STORAGE DEVICES

FIELD OF THE INVENTION

The present invention relates to mounting apparatuses, and more particularly to a mounting apparatus for an electronic storage device, which allows convenient installation and removal of the storage device.

DESCRIPTION OF RELATED ART

An electronic apparatus, such as a computer or server, usually includes storage devices, such as hard disk drives, compact disk read-only memory (CD-ROM) drives, digital video disc (DVD) drives, and the like. These devices are typically added to increase the functionality of the electronic apparatus as desired by a user. However, the installation of such devices in the electronic apparatus is usually labor-intensive.

The installation of a hard disk drive in a computer enclosure typically involves use of screws to attach the hard disk drive to a drive bracket of the computer enclosure. Typically, the screws are small, and so are difficult to handle and easily lost. If the screws are lost within the computer enclosure damage may occur.

To address the aforementioned problems, a plurality of mounting apparatuses is invented to reduce the number of needed screws or no use of screws. For example, a pair of detachable sliding rails is attached to opposite sides of a storage device with screws. The storage device is slid into and is secured to a drive bracket by an operating member attached to the drive bracket. However, in assembly, some screws are still needed to attach the sliding rails to the storage device. Furthermore, the screws also have to be removed to detach the sliding rails from the storage device before replacing the storage device.

What is desired, therefore, is a mounting apparatus which securely holds a storage device in a drive bracket and allows convenient installation and/or removal of the storage device to or from the drive bracket.

SUMMARY OF THE INVENTION

In one preferred embodiment, a mounting apparatus for holding a storage device with a plurality of mounting holes in a side thereof includes a bracket for accommodating the storage device therein, and a fastener. The bracket includes a first sidewall and a second sidewall parallel to the first sidewall. The first sidewall comprises a pair of installing plates and a securing portion extending out therefrom, and a plurality of through holes is defined between the pair of installing plates and the securing portion, corresponding to the mounting holes. A first pivoting hole and a second pivoting hole are respectively defined in the pair of installing plates, and a locking notch is defined in the securing portion. The fastener includes a pivot end pivotally attached to the pair of installing plates, and a free end forming a locking portion engagable with the securing portion. The pivot end forms a first pivoting pole and a second pivoting pole respectively received in the first pivoting hole and the second pivoting hole. A block protrudes from the locking portion and is received in the locking notch. A plurality of locking pegs projects from the fastener and is inserted into the corresponding mounting holes of the storage device via the through holes of the first sidewall.

Other advantages and novel features will become more apparent from the following detailed description of preferred embodiments when taken in conjunction with the accompanying drawings, in which:

DETAILED DESCRIPTION OF THE INVENTION

Figure 1:
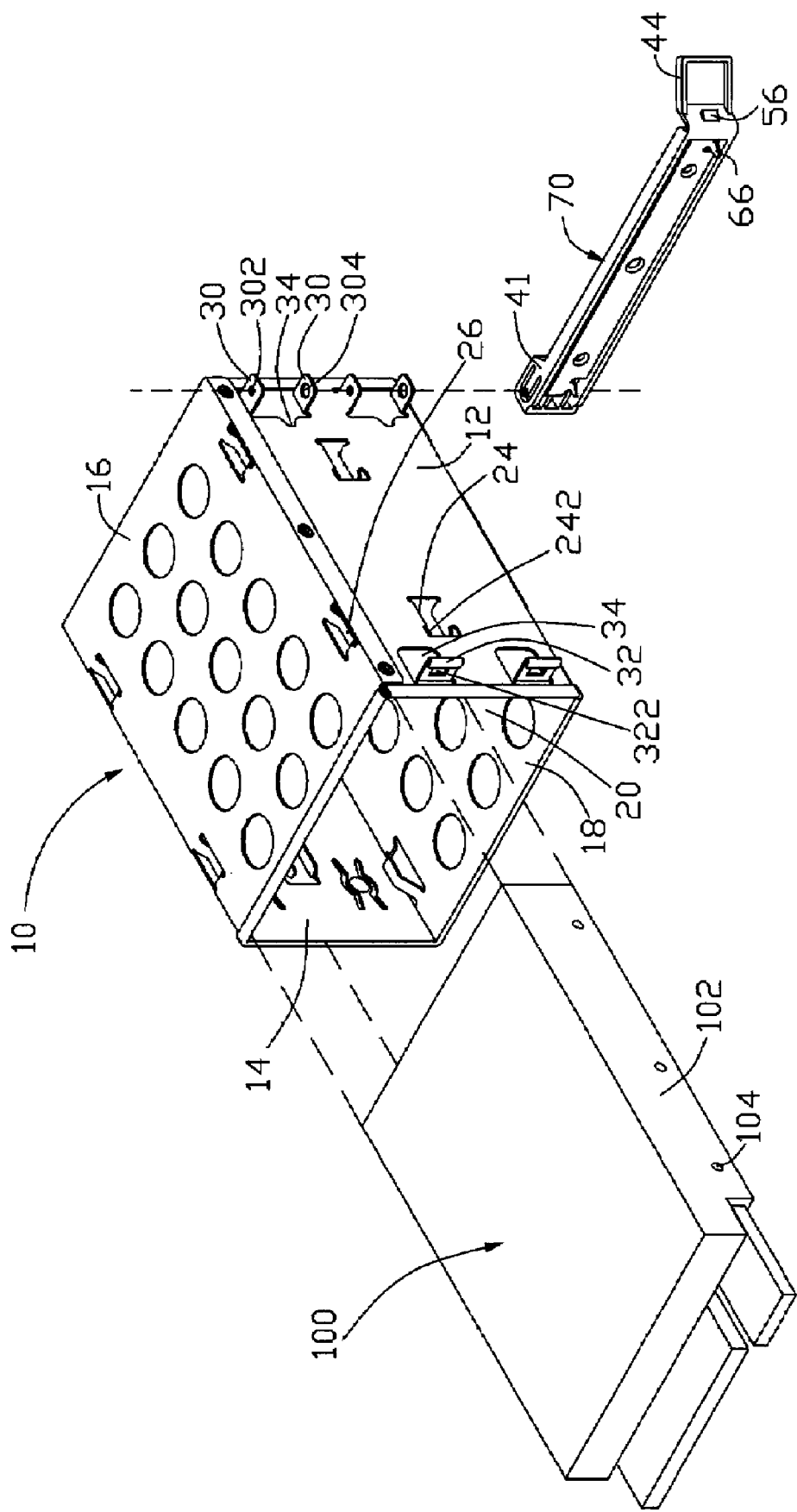
FIG. 1 is an exploded perspective view of a mounting apparatus for storage devices in accordance with a preferred embodiment of the present invention, together with a storage device.

Referring to FIG. 1, in a preferred embodiment of the invention, a mounting apparatus is provided for holding a storage device 100 with a plurality of aligned, spaced mounting holes 104 in a side 102 thereof. The mounting apparatus includes a bracket 10 for accommodating the storage device 100 therein and an elongated fastener 70 pivotally attached to the bracket 10 to secure the storage device 100.

Figure 2:
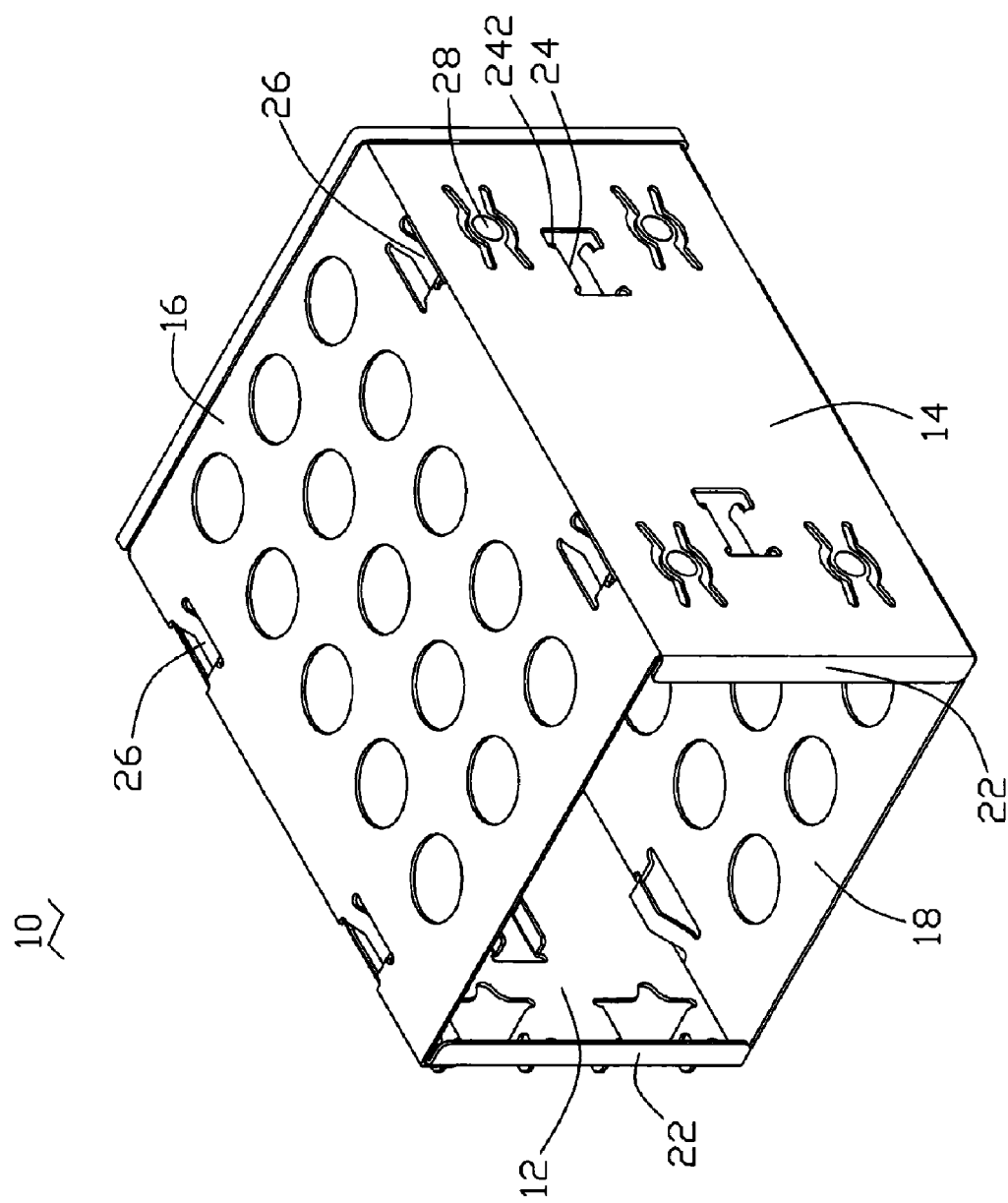
FIG. 2 is an enlarged view of a bracket of the mounting apparatus of FIG. 1, but from another aspect.

Referring also to FIG. 2, the bracket 10 includes a first sidewall 12, a second sidewall 14, a top wall 16, and a bottom wall 18. The first sidewall 12 and the second sidewall 14 are parallel to each other and perpendicular to the top wall 16 and the bottom wall 18. The top wall 16 connects top portions of the first sidewall 12 and the second sidewall 14, and the bottom wall 18 connects bottom portions of the first sidewall 12 and the second sidewall 14. An entrance 20 is defined at an end of the bracket 10 for the entry of the storage device 100. A pair of resisting portions 22 oppositely bends from end portions of the first sidewall 12 and the second sidewall 14, which are away from the entrance 20. The pair of resisting portions 22 is used for preventing the storage device 100 passing beyond a back edge of the bracket 10.

A plurality of aligned, spaced supporting tabs 24 is stamped inwardly from the first sidewall 12 and the second sidewall 14 respectively for supporting the storage device 100. A plurality of aligned, spaced engaging portions 26 is stamped from the top wall 16 respectively near to the first sidewall 12 and the second sidewall 14, corresponding to the supporting tabs 24. The engaging portions 26 are trapeziform and elastically deformable under pressure. An end of each of the supporting tabs 24, which is near to the entrance 20, is sloped down as a guiding slope 242. The guiding slopes 242 are for guiding the storage device 100 into the bracket 10. A plurality of aligned, spaced elastic portions 28 is stamped from the second sidewall 14 between the supporting tabs 24 and the corresponding engaging portions 26. The elastic portions 28 are used for abutting against the storage device 100 to absorb vibration and provide effective grounding.

An end of the first sidewall 12, away from the entrance 20, is stamped out to form a pair of installing plates 30, corresponding to the support tabs 24 and the corresponding engaging portions 26. A first pivoting hole 302 and a second pivoting hole 304 are respectively defined in the pair of installing plates 30. A securing portion 32 is stamped out from the other end of the first sidewall 12, opposite to the pair of installing plates 30. A locking notch 322 is defined in the securing portion 32. A plurality of aligned, spaced through holes 34 is defined in the first sidewall 12 between the pair of installing plates 30 and the securing portion 32, capable of in alignment with the mounting holes 104 of the storage device 100. One of the through holes 34 is an opening left by stamping the securing portion 32 in the first sidewall 12.

Figure 3:
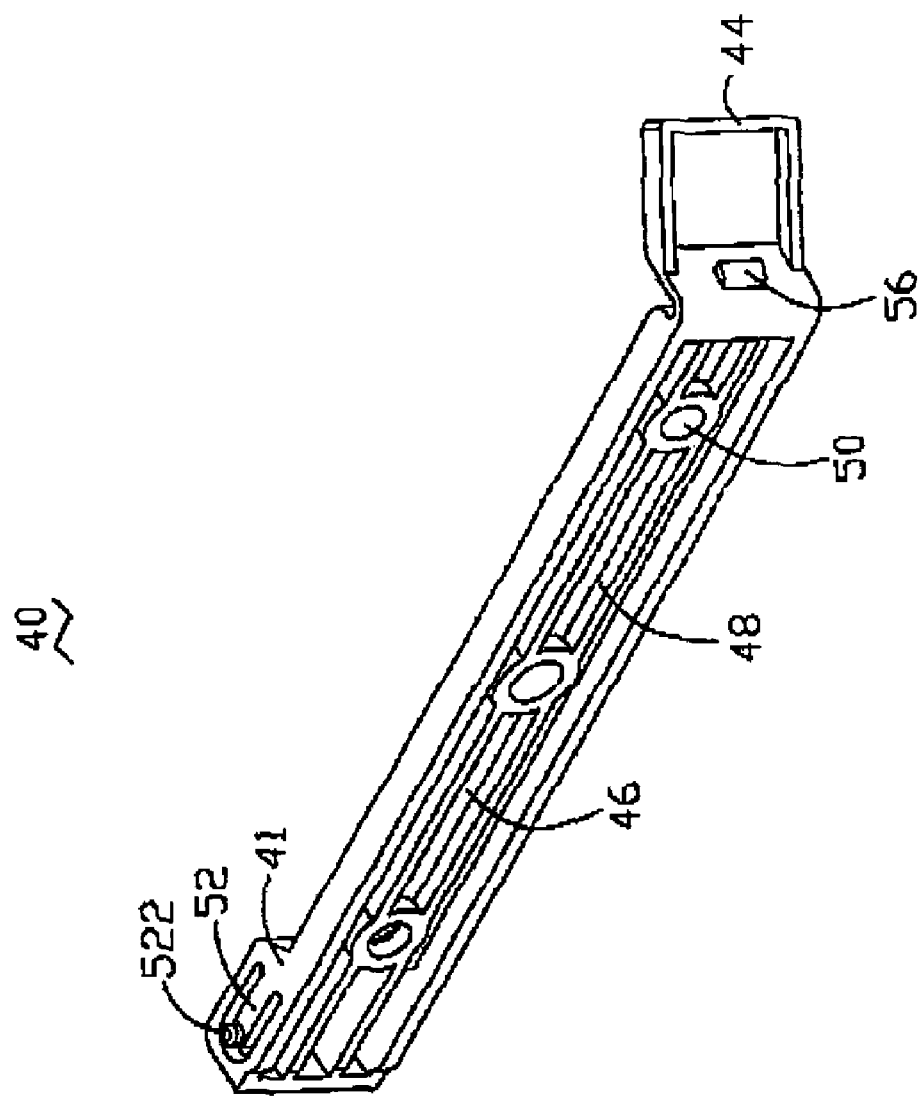
FIG. 3 is an enlarged view of an installing member of the mounting apparatus of FIG. 1.
Figure 4:
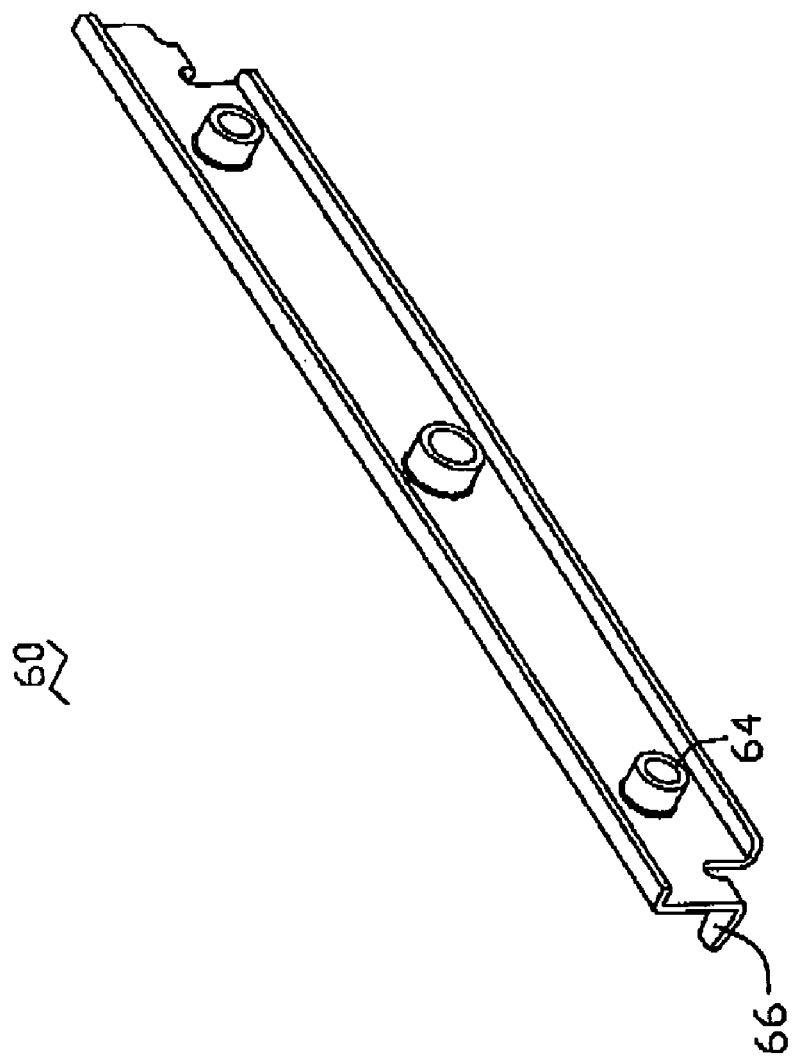
FIG. 4 is an enlarged view of a locking member of the mounting apparatus of FIG. 1.
Figure 5:
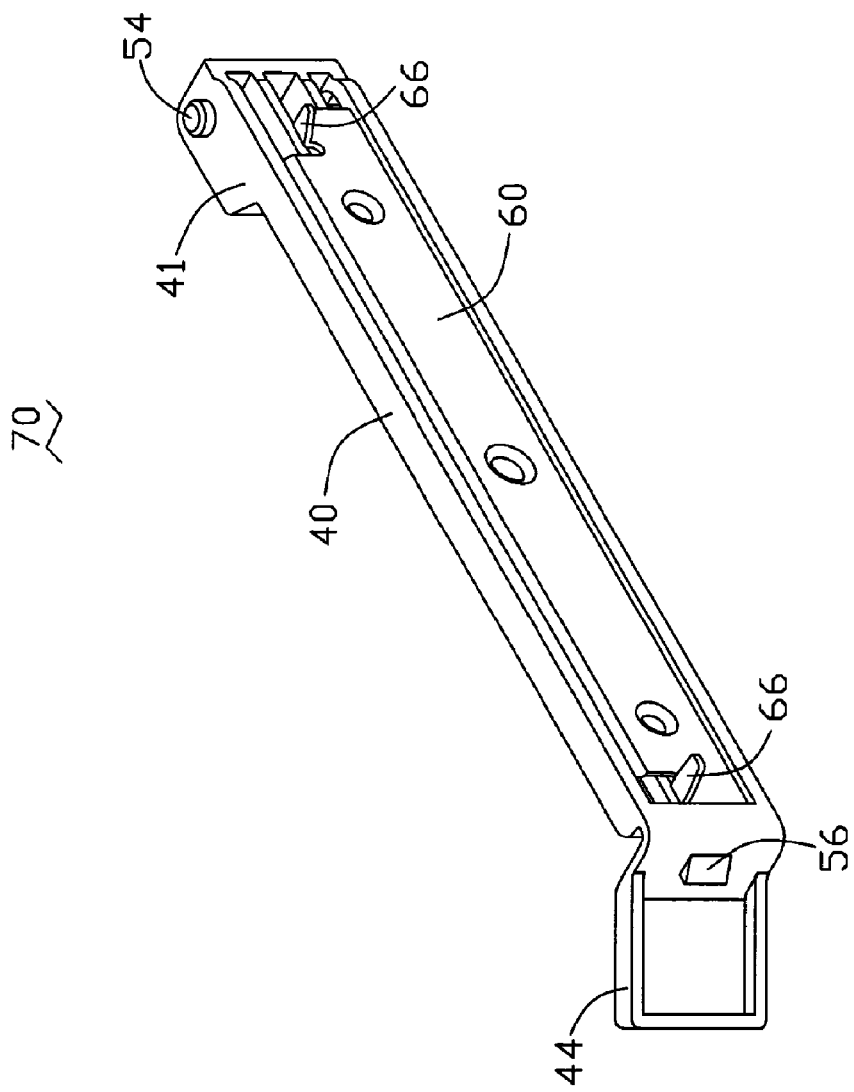
FIG. 5 is a perspective view of a fastener comprising the installing member of FIG. 3 and the locking plate of FIG. 4.
Figure 6:
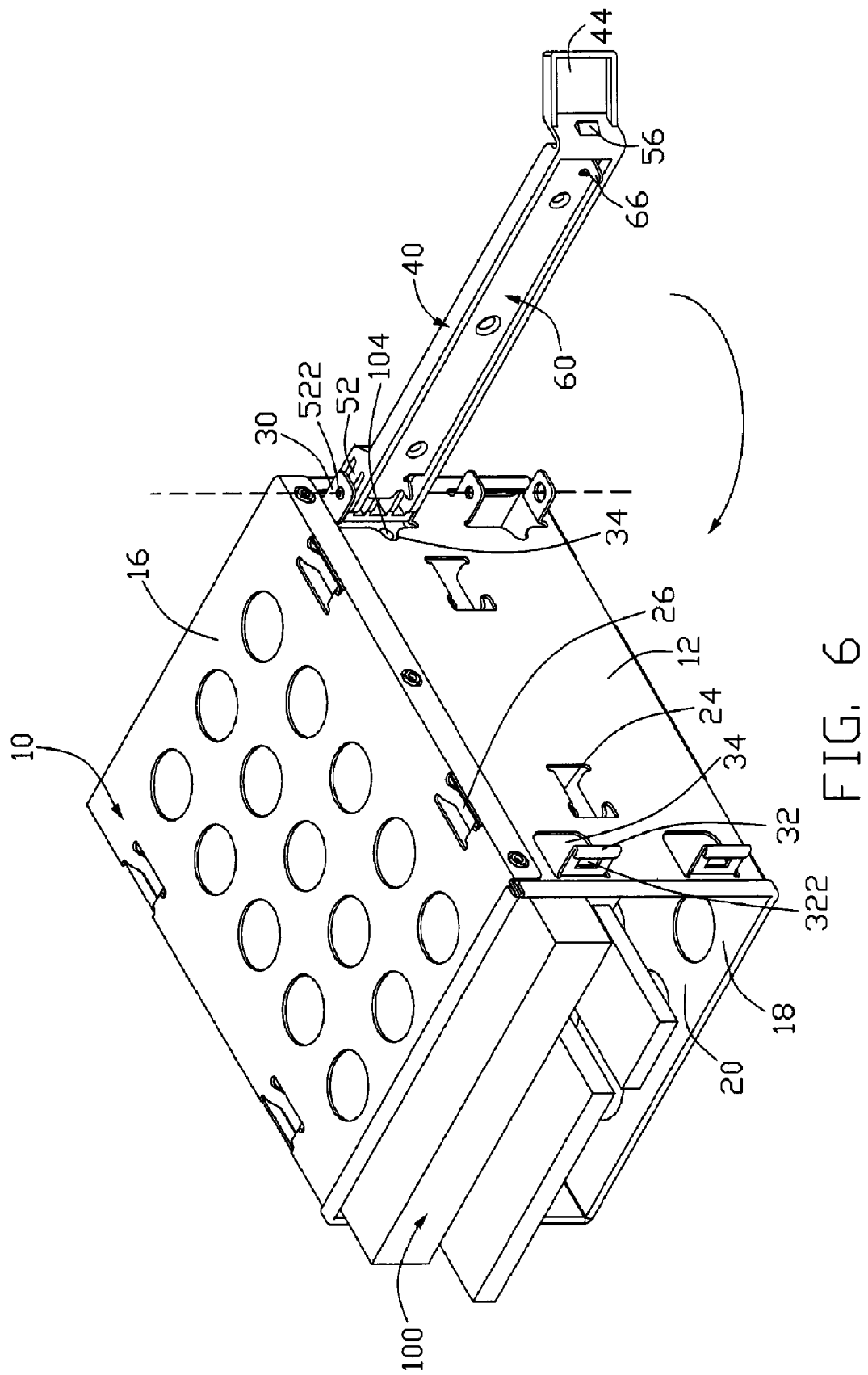
FIG. 6 is an enlarged assembled view of the mounting apparatus of FIG. 1, with the fastener in an open position.
Figure 7:
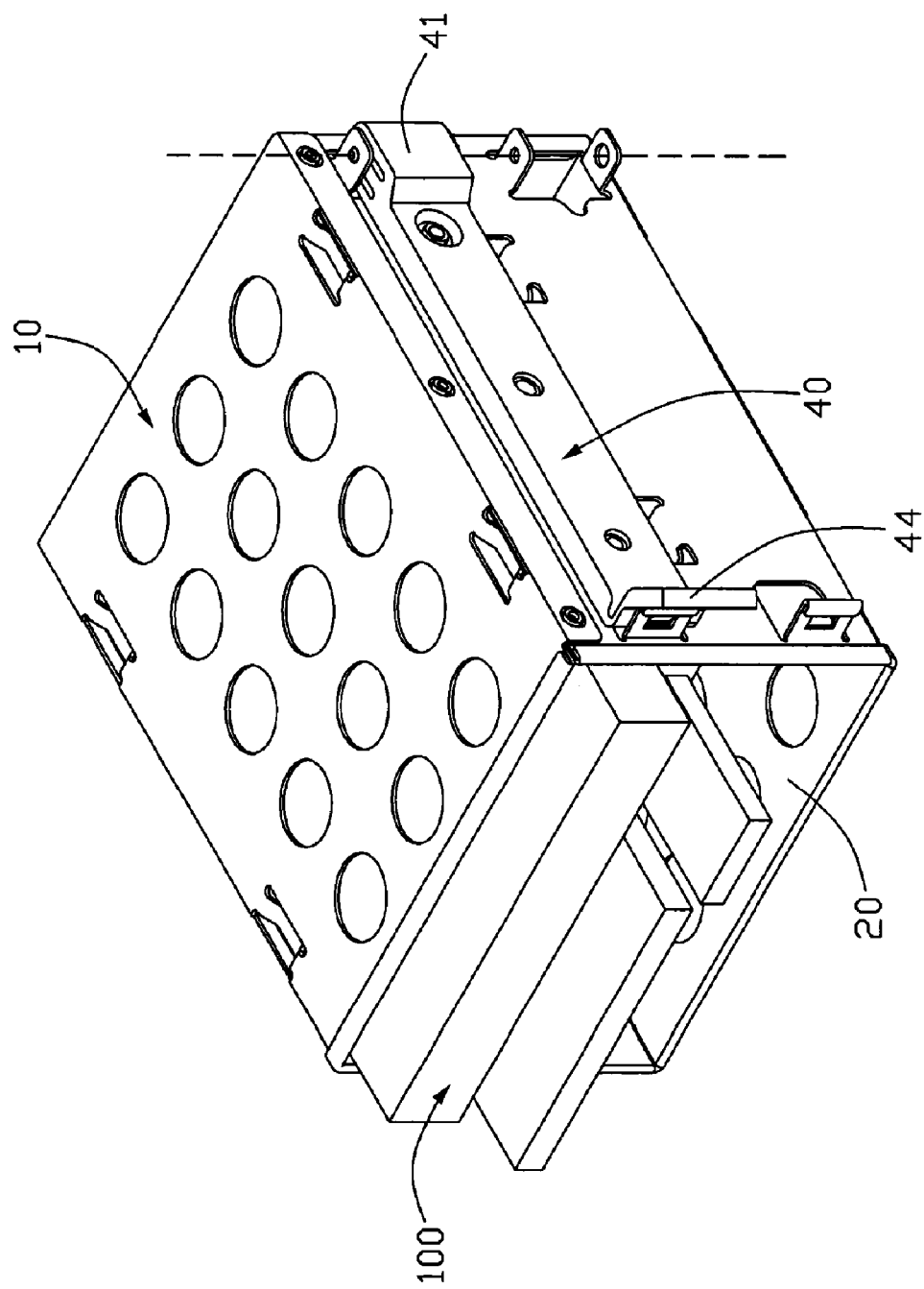
FIG. 7 is an enlarged assembled view of the mounting apparatus of FIG. 1, with the fastener in a closed position.

Referring to FIGS. 3, 4 and 5, the fastener 70 includes an elongated installing member 40 and an elongated locking plate 60. The installing member 40 may be made of plastic, and includes a pivot end 41 and a locking portion 44 extending at an angle from a free end thereof. An elongated recess 46 is defined in a side of the installing member 40 and extends in the elongated extension direction of the installing member 40. Reinforcing ribs 48 are formed in, and a plurality of aligned spaced securing holes 50 is defined in, the recess 46. The pivot end 41 of the installing member 40 has an elastic tongue 52 in a side thereof, leaving a generally U-shaped slot between the elastic tongue 52 and the side of the pivot end, thus the elastic tongue 52 can be easily deformed towards the inside of the pivot end under pressure. A first pivoting pole 522 protrudes from a distal free end of the tongue 52, corresponding to the first pivoting hole 302 (see FIG. 1). A second pivoting pole 54 protrudes from the other side of the pivot end 41, corresponding to the second pivoting hole 304 (see FIG. 1). A wedge-shaped block 56 protrudes from the locking portion 44, corresponding to the locking notch 322 of the securing portion 32.

The locking plate 60 is received in the recess 46 of the installing member 40. A plurality of aligned, spaced positioning posts 64 projects in from a side of the locking plate 60, corresponding to and received in, the securing holes 50 of the installing member 40. A plurality of aligned, spaced locking pegs 66 projects from the locking plate 60 in a direction opposite to that of the positioning posts 64, corresponding to the mounting holes 104 of the storage device 100.

Referring to FIGS. 1-7, in assembly, the positioning posts 64 of the locking plate 60 are inserted in the corresponding securing holes 50 of the installing member 40, thereby the locking plate 60 is received in the recess 46 of the installing member 40, and the installing member 40 and the locking plate 60 cooperatively form the elongated fastener 70. The fastener 70 is pivotally attached to the pair of installing plates 30 of the first sidewall 12, with the second pivoting pole 54 of the installing member 40 being pivotally received in the second pivoting hole 304 and the first pivoting pole 522 being pivotally received in the first pivoting hole 302 via the tongue 52 being deformed under pressure. Thus, the fastener 70 is at an angle in relation to the first sidewall 12 of the bracket 10. The storage device 100 is put into the bracket 10 sliding along the supporting tabs 24 and the corresponding engaging portions 26 until the storage device 100 touches the pair of resisting portions 22. Thus, the storage device 100 is received in the bracket 10 and abuts against the elastic portions 28, the supporting tabs 24 and the corresponding engaging portions 26. The side 102 of the storage device 100 abuts the first sidewall 12 of the bracket 10 in parallel, and the mounting holes 104 of the storage device 100 are in alignment with the through holes 34 of the first sidewall 12.

Rotating the fastener 70 towards the first sidewall 12 of the bracket 10, the locking pegs 66 of the locking plate 60 pass through the through holes 34 of the first sidewall 12 and insert into the corresponding mounting holes 104 of the storage device 100 along a direction perpendicular to the elongated extension direction of the fastener 70. When the block 56 of the locking portion 44 touches the securing portion 32 of the first sidewall 12, the locking portion 44 is urged out, and then the block 56 is snappingly locked into the locking notch 322 of the locking portion 44. The fastener 70 is pivoted substantially parallel with the first sidewall 12 of the bracket 10. Thus, the storage device 100 is securely held in the bracket 10 by the fastener 70.

To detach the storage device 100 from the bracket 10, the locking portion 44 is moved away from the first sidewall 12, and the block 56 leaves the locking notch 322, and the fastener 70 is rotated out from the first sidewall 12. Simultaneously the locking pegs 66 move out of the mounting holes 104 of the storage device 100 and the corresponding through holes 34 of the first sidewall 12. Thus, the storage device 100 is easily taken out from the entrance 20 of the bracket 10.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A mounting apparatus for holding a storage device with a plurality of mounting holes in a side thereof, the mounting apparatus comprising:

a bracket adapted for accommodating the storage device therein, and comprising a first sidewall and a second sidewall parallel to the first sidewall, the first sidewall comprising a pair of installing plates and a securing portion extending out therefrom, and a plurality of through holes defined between the pair of installing plates and the securing portion, corresponding to the mounting holes, the pair of installing plates respectively defining a first pivoting hole and a second pivoting hole, the securing portion defining a locking notch; and a fastener comprising a pivot end pivotally attached to the pair of installing plates, and a free end forming a locking portion engagable with the securing portion, a first pivoting pole and a second pivoting pole respectively received in the first pivoting hole and the second pivoting hole protruding from the pivot end, a block protruding from the locking portion and being received in the locking notch, a plurality of locking pegs projecting from the fastener and being inserted into the corresponding mounting holes of the storage device via the through holes of the first sidewall;

wherein an elastic tongue, with the first pivoting pole protruding from a distal free end thereof, is formed on a side of the pivot end, leaving a slot between the elastic tongue and the side of the pivot end, thereby the first pivoting pole is pivotally received in the first pivoting hole via the tongue being deformed.

2. The mounting apparatus as claimed in claim 1, wherein the fastener comprises an installing member and a locking plate secured to the installing member, the installing member comprises the pivot end and the free end, and the locking pegs project from the locking plate.

3. The mounting apparatus as claimed in claim 2, wherein a recess is defined in a side of the installing member, the locking plate is received in the recess, a plurality of securing holes is defined in the recess, and a plurality of positioning posts projects in from a corresponding side of the locking plate to engage in the securing holes.

4. The mounting apparatus as claimed in claim 3, wherein the locking pegs project from the locking plate in a direction opposite to that of the positioning posts.

5. The mounting apparatus as claimed in claim 1, wherein a pair of resisting portions oppositely bends from end portions of the first sidewall and the second sidewall, and an end of the storage device abuts the pair of resisting portions.

6. The mounting apparatus as claimed in claim 1, wherein the securing portion is stamped out from the first sidewall, leaving an opening in the first sidewall as one of the through holes.

7. A mounting apparatus assembly comprising:
 a storage device with a plurality of mounting holes in a side thereof;
 a bracket adapted for accommodating the storage device therein, and comprising a first sidewall abutting the side of the storage device in parallel, and a second sidewall parallel to the first sidewall, a pair of installing plates and a securing portion extending out from the first sidewall, and a plurality of through holes defined in the first sidewall between the pair of installing plates and the securing portion, in alignment with the mounting holes, the pair of installing plates respectively defining a first pivoting hole and a second pivoting hole, the securing portion defining a locking notch; and
 an elongated fastener comprising a pivot end pivotally attached to the pair of installing plates, and a free end forming a locking portion engagable with the securing portion, a first pivoting pole and a second pivoting pole respectively received in the first pivoting hole and the second pivoting hole protruding from the pivot end, a block protruding from the locking portion and being received in the locking notch, a plurality of locking pegs projecting from the fastener along a direction perpendicular to the elongated extension direction of the fastener, and being inserted into the corresponding mounting holes of the storage device via the through holes of the first sidewall, wherein when the locking pegs are engaged in the mounting holes of the storage device, the fastener is substantially parallel with the side of the storage device with the block engaging with the locking notch.

8. The mounting apparatus assembly as claimed in claim 7, wherein the fastener comprises an installing member and a locking plate secured to the installing member, the installing member comprises the pivot end and the free end, and the locking pegs project from the locking plate.

9. The mounting apparatus assembly as claimed in claim 8, wherein a recessed portion is formed in a side of the installing member, the locking plate is received in the recessed portion, a plurality of securing holes is defined in the recessed portion, and a plurality of positioning posts projects in from a corresponding side of the locking plate to engage in the securing holes.

10. The mounting apparatus assembly as claimed in claim 9, wherein the locking pegs project from the locking plate in a direction opposite to that of the positioning posts.

11. The mounting apparatus assembly as claimed in claim 8, wherein an elastic tongue is formed on a side of the pivot end of the installing member, the first pivoting pole protrudes from a free end of the tongue, and the second pivoting pole protrudes from the other side of the pivot end.

12. The mounting apparatus assembly as claimed in claim 7, wherein a pair of resisting portions oppositely bends from end portions of the first sidewall and the second sidewall, and an end of the storage device abuts the pair of resisting portions.

13. A mounting apparatus for holding a storage device with a plurality of mounting holes in a side thereof, the mounting apparatus comprising:
 a bracket adapted for receiving the storage device therein, and comprising a sidewall abutting the side of the storage device, a pair of installing plates and a securing portion extending out from the sidewall, the pair of installing plates respectively defining a first pivoting hole and a second pivoting hole, the securing portion defining a locking notch;
 an elongated locking plate forming a plurality of locking pegs perpendicularly projecting therefrom, the locking pegs capable of being inserted into the corresponding mounting holes of the storage device; and
 an elongated installing member comprising a pivot end and a locking portion opposite to the pivot end, a first pivoting pole and a second pivoting pole protruding from the pivot end and being respectively received in the first pivoting hole and the second pivoting hole, thereby the pivot end being pivotally attached to the pair of installing plates, a block protruding from the locking portion and capable of being received in the locking notch to secure the storage device in the bracket;
 wherein the installing member is pivotable between a first position where the installing member is at an angle in relation to the sidewall of the bracket, and second position where the installing member is substantially parallel with the sidewall of the bracket, and the locking plate is fixed to the installing member and rotatable together with the installing member.

14. The mounting apparatus as claimed in claim 13, wherein an elastic tongue, the first pivoting pole protruding therefrom, is framed on a side of the pivot end, leaving a slot between the elastic tongue and the side of the pivot end, thereby the first pivoting pole is pivotally received in the first pivoting hole via the tongue being deformed.

15. The mounting apparatus as claimed in claim 13, wherein a plurality of securing holes is defined in the installing member, a plurality of positioning posts projects in from the locking plate to engage in the securing holes, and the locking pegs project from the locking plate in a direction opposite to the extending direction of the positioning posts.

* * * * *